United States Patent [19]

Terada et al.

[11] Patent Number: 4,845,890
[45] Date of Patent: Jul. 11, 1989

[54] SIDE WINDOW FOR MOTOR VEHICLE

[75] Inventors: Haruhiko Terada, Chiryu; Shigeyuki Kawagoe, Anjo, both of Japan

[73] Assignee: Aisin Seiki Kabushiki Kaisha, Japan

[21] Appl. No.: 152,475

[22] Filed: Feb. 5, 1988

[30] Foreign Application Priority Data

Feb. 6, 1987 [JP] Japan .................. 62-016717[U]

[51] Int. Cl.$^4$ ............................................. E05D 15/20
[52] U.S. Cl. .......................................... 49/130; 49/128
[58] Field of Search .............. 49/127, 128, 130, 209, 49/142, 168, 143, 145, 163

[56] References Cited

U.S. PATENT DOCUMENTS 4,667,219 6/1987 Tomida .................................. 49/130
4,708,410 11/1987 Mazaki .................................. 49/130

FOREIGN PATENT DOCUMENTS 584426 9/1933 Fed. Rep. of Germany ........ 49/127

Primary Examiner—Kenneth J. Dorner
Assistant Examiner—Gerald A. Anderson
Attorney, Agent, or Firm—Finnegan, Henderson, Farabow, Garrett & Dunner

[57] ABSTRACT

A side window for motor vehicle includes a window frame fixed to a longitudinal side of a motor vehicle body, a pair of guide rails mounted on the window frame in a longitudinal direction, a first windshield slidably mounted on the guide rails, a second windshield installed in the window frame and tiltable toward the exterior of the vehicle body around a pin supported at one end thereof by a preset angle, a slide-crank mechanism for freeing the slide path of the first windshield from the second windshield in response to sliding the first windshield and for arranging both first and second windshields in a same plane in closed position of both first and second windshields.

3 Claims, 6 Drawing Sheets

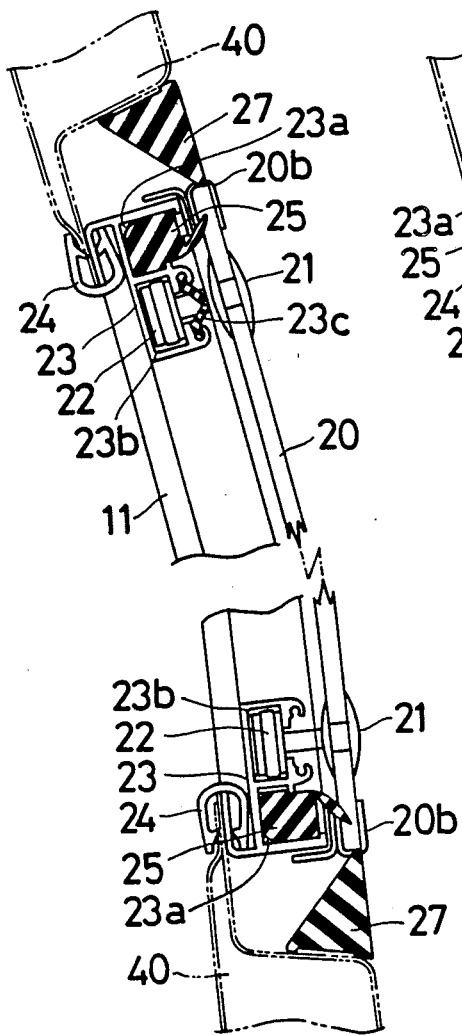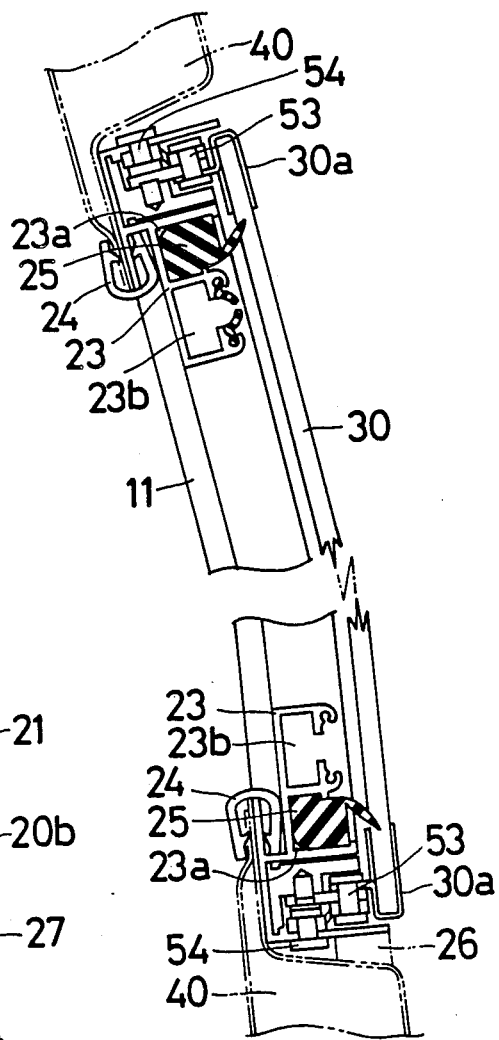

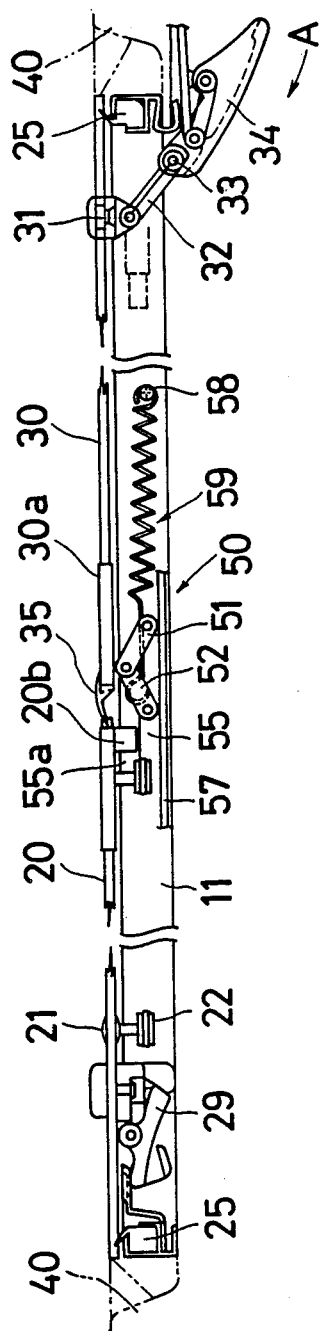
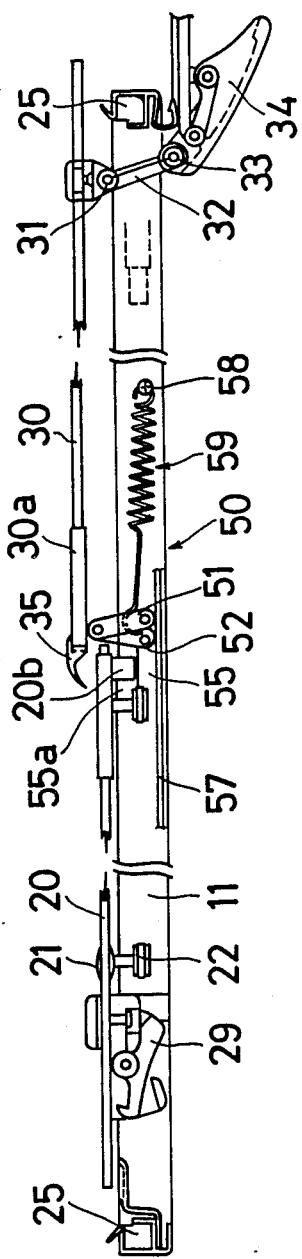
FIG. 4
FIG. 5

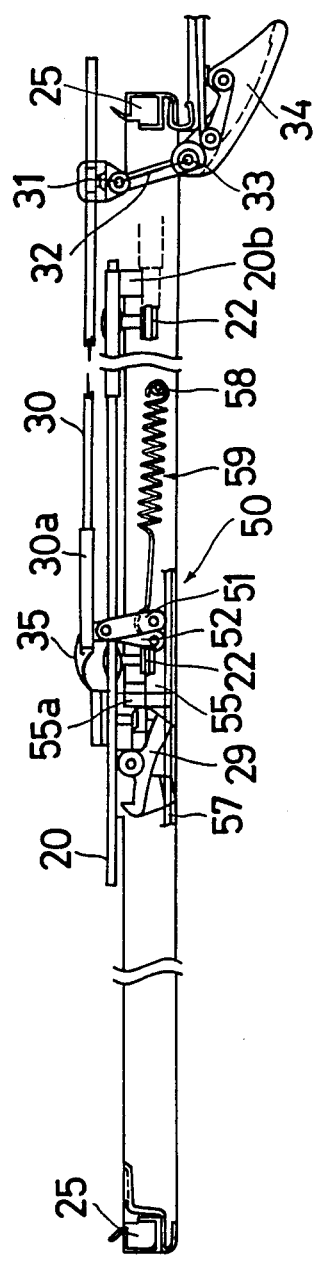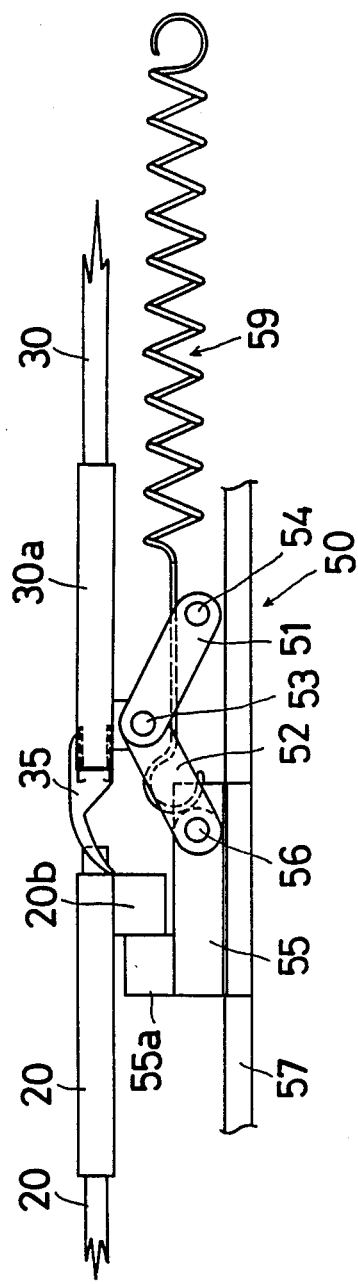

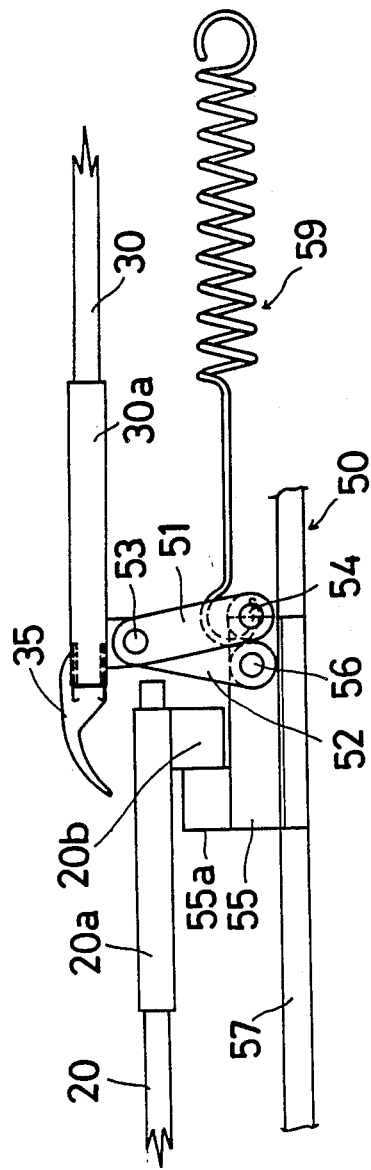
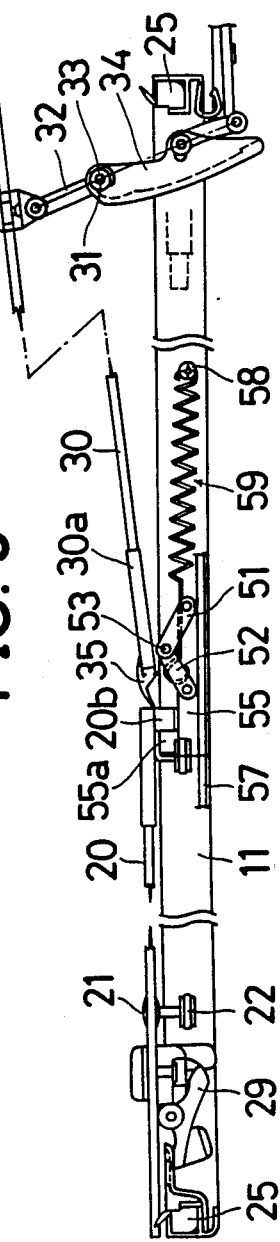

SIDE WINDOW FOR MOTOR VEHICLE

BACKGROUND OF THE INVENTION

1. Field of the Invention:

This invention relates to a side window for a motor vehicle. More particularly, it relates to a side window comprising two windshields installed in a window frame wherein both windshields are possible to open and close.

2. Description of the Prior Art:

In a conventional side window for a motor vehicle as shown in FIGS. 11 and 12, an inner guide slot 1a and an outer guide slot 1b are formed on a window frame 1 fixed to a longitudinal side of motor vehicle body (not shown). A front windshield 2 is slidably installed in the inner guide slot 1a. A rear windshield 3 is slidably installed in the outer guide slot 1b. However in the foregoing structure, a stepped portion appears between the front and rear windshield 2 and 3 whereby it looks awkward and also noise is generated by wind hitting the stepped portion.

SUMMARY OF THE INVENTION

The present invention has basically solved the foregoing disadvantages in the prior art.

Therefore, one object of the present invention is to provide a side window having two windshields installed in a window frame wherein both windshields are arranged in the same plane in the closed position thereof and both windshields are capable of being opened and closed.

To achieve the objects and in accordance with the purpose of the invention, as embodied and broadly described herein, the side window of this invention comprises a window frame fixed to the side of the motor vehicle body, a pair of guide rails formed in a longitudinal direction on the window frame, a first windshield slidably mounted on the guide rails, a second windshield installed in the window frame and tiltable by a preset angle toward the exterior of the vehicle body around a pin supported at an end of said second windshield, thereby opening the second windshield, a slide-crank mechanism for freeing the slide path of the first windshield from the second windshield to permit the opening of the first windshield, and for placing both the first and second windshields in the same plane in the closed position, the slide-crank mechanism including first and second links each having first and seconds ends, each of the first and second links being rotatably mounted on the pin at their respective first ends, the second end of the first link being rotatably supported by the window frame, and a slider, the second end of the second link being rotatably supported by the slider, the slider sliding in the same direction as the first windshield during its opening.

Therefore, according to the present invention, by the use of the slide-crank mechanism, both the first and second windshield are arranged in the same plane when both are in the closed position, and the sliding path of the first windshield is freed from interference with the second windshield even when the latter is tilting toward the exterior of the motor vehicle body, whereby the occurrence of noise is lessened, and also it is possible to open and close both windshields.

BRIEF DESCRIPTION OF THE DRAWINGS

Various other objects, features and attendant advantages of the present invention will be more fully appreciated as the same becomes better understood from the following detailed description when considered in connection with accompanying drawings.

FIG. 2 is a cross-sectional view taken along line II—II of FIG. 1;

FIG. 3 is a cross-sectional view taken along line III—III of FIG. 1;

FIG. 4 is a cross-sectional view taken along line IV—IV of FIG. 1;

FIGS. 5 and 6 are views similar to FIG. 4 but showing the operation of the side window;

FIGS. 7 and 8 are enlarged views corresponding to FIGS. 4 and 5;

FIGS. 9 and 10 are views similar to FIG. 4 but they show other operational features of the side window;

DETAILED DESCRIPTION OF THE PREFERRED EMBODIMENTS

Figure 1:
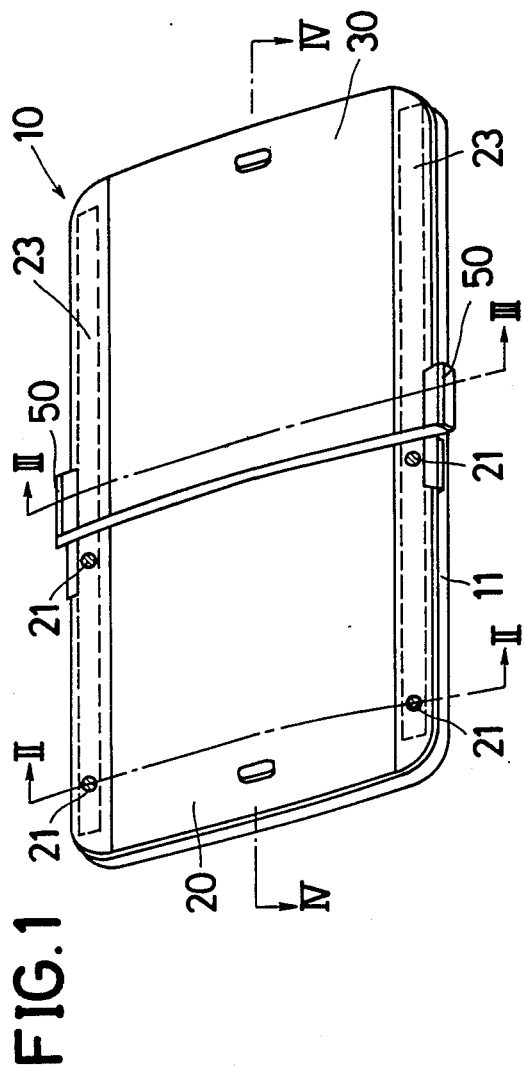
FIG. 1 is a perspective view of a side window in the present invention.
Figure 12:
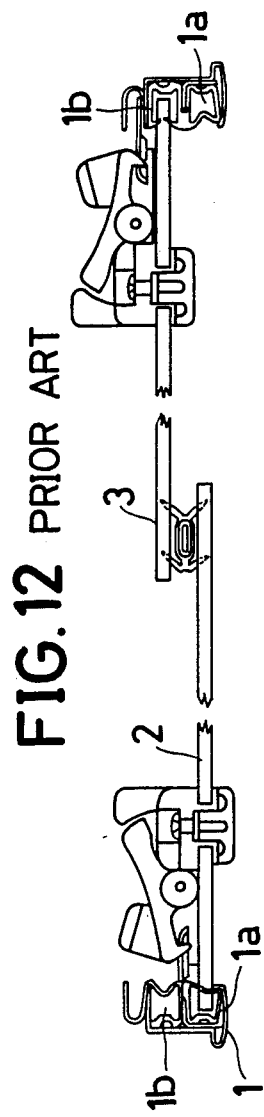
FIG. 12 is a cross-sectional view taken along the line XII—XII.

Referring now to the drawings, there is shown in FIG. 1 a side window 10 having a window frame 11 fixed to a longitudinal side of motor vehicle body 40 (see FIGS. 2, 3, and 4) and first and second windshields 20 and 30 installed in the frame 11.

A retainer 21 is mounted on each corner of the first windshield 20. A guide roller 22 mounted on each retainer 21 is arranged to be parallel to a surface of first windshield 20. A channel member 23 having a slot 23a and a guide rail 23b is formed on upper and lower portions of the frame 11 in the whole of the longitudinal direction. The guide roller 22 is slidably inserted in the guide rail 23b to permit the sliding of the first windshield 20 in a longitudinal direction.

A lip member 23c made of rubber is fixed to the guide rail 23b and contacts with the retainer 21 so as to cover the guide rail 23b. In FIGS. 2 and 3, the lip member 23c fixed to the lower guide rail 23b is omitted from the drawings so as to clearly show a shape of guide rail 23b. A weather strip 25 for sealing is inserted in each slot 23a of channel member 23. Also, the weather strip 25 is inserted in each side of frame 11 (see FIG. 4).

A weather strip 27 for sealing a portion between the first windshield 20 and the vehicle body 40 is supported on the body 40. The height of window frame 10 against the vehicle body 40 is defined by a member 26 fixed to a bottom surface of frame 10. The window frame 10 is fixed to the vehicle body 40 at the defined height by a clip 24.

As shown in FIG. 3, a holder 30a is fixed to a front portion (left side in FIG. 4) in upper and lower portions of second windshield 30 and connected to the channel member 23 via a slide-crank mechanism 50 for arranging both first and second windshields 20 and 30 in the same place in the closed position of first and second windshield 20 and 30 and the freeing slide path of first windshield 20 from second windshield 30 during opening of the window. In FIGS. 4 through 6, a toggle mechanism 34 for closing the second windshield 30 and tilting the second windshield 30 toward the exterior of vehicle body 40 by a preset angle so as to open the second windshield 30 is mounted on the central rear portion (right side in FIG. 4) of second windshield 30. One end of a link 32 is rotatably mounted around a pin 31 connected to the second windshield 30. The other end of link 32 is rotatably mounted around a pin 33 supported on the toggle mechanism 34.

As shown in FIGS. 7 and 8, one end of links 51 and 52 of slide-crank mechanism 50 are rotatably mounted around a pin 53 supported on the holder 30a of second windshield 30. The other end of link 51 is rotatably mounted around a pin 54 supported on the channel member 23. The other end of link 52 is rotatably mounted around a pin 56 supported on a slider 55. The slider 55 is slidably supported on a guide 57 formed on the channel member 23. The slider 55 has an engaging member 55a engaging with a engaging member 20b fixed to the first windshield 20. The slider 55 is biased toward opening direction of first windshield 20 by a biasing force of a spring 59 fixed to the channel 23 via a pin 58 (see FIGS. 4-6).

The operation of side window 10 is as follows:

As shown in FIG. 4, under the condition of which both first and second windshield 20 and 30 are closed, both first and second windshield 20 and 30 are arranged in the same plane by the operation of the slide-crank mechanism 50. Also, both first and second windshield 20 and 30 are arranged in a same plane of vehicle body 40. A longitudinal gap between first and second windshield 20 and 30 are sealed by a sealing member 35 supported on and along a front edge of second windshield 30. The first windshield 20 is locked to the window frame 11 by a conventional locking mechanism 29. Also, the second windshield 30 is locked to the window frame 11 by the toggle mechanism 34.

When the locking mechanism 29 is released, the first windshield 20 and the slider 50 are caused to slide by the biasing force of spring 59 due to the engagement between engaging members 20b and 55a whereby link 51 and 52 are moved to a position indicated in FIG. 8 and the second windshield 30 and the sealing member 35 are moved toward the exterior of vehicle body 40 as shown in FIG. 8. Therefore, the slide path of first windshield 20 is freed from the second windshield 30 and the sealing member 35. Consequently, the first windshield 20 is opened without any manual operation of second windshield 30 as shown in FIG. 6.

Figure 10:
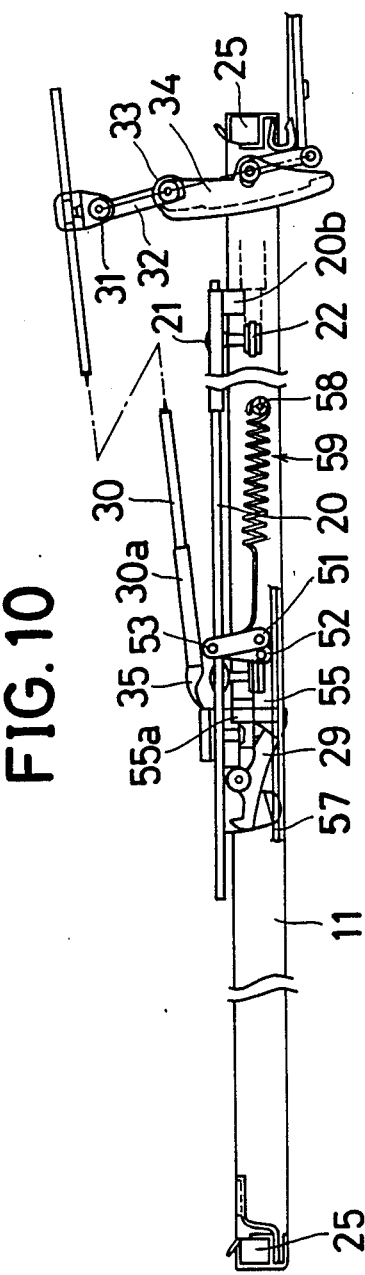
Figure 11:
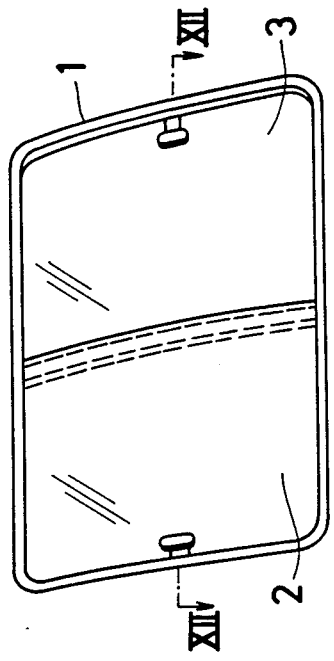
FIG. 11 is a perspective view of a conventional side window.

When the toggle mechanism 34 is manually rotated in a direction indicated by arrow A in FIG. 4, whereby the second windshield 30 is rotated around the pin 53 and tilted outwardly by the preset angle, the second windshield is thereby opened, as shown in FIG. 9. In this condition, if the locking mechanism 29 is released by the biasing force of spring 59, links 51 and 52 are moved to the position as shown in FIG. 8 whereby the second windshield 30 and the sealing member 35 move toward exterior of vehicle body 40. Therefore, the slide path of first windshield 20 is freed from interference from the second windshield 30 and the sealing member 35. Consequently, the first windshield 20 is able to slide to the opening position as shown in FIG. 10, even though the second windshield 30 is in the open position.

Obviously, many modifications and variations of the present invention are possible in light of the above teachings. It is therefore to be understood that within the scope of the appended claims the invention may be practiced otherwise than as specifically described herein.

What is claimed is:

1. A side window for the side of a motor vehicle body, comprising:
    a window frame fixed to the side of the motor vehicle body;
    a pair of guide rails formed in a longitudinal direction on said window frame;
    a first windshield slidably mounted on said guide rails;
    a second windshield installed in said window frame and tiltable by a preset angle toward the exterior of the vehicle body around a pin supported at an end of said second windshield, thereby opening said second windshield;
    a slide-crank mechanism for freeing the slide path of said first windshield from said second windshield to permit the opening of said first windshield, and for placing both the first and second windshields in the same plane in the closed position, said slide-crank mechanism including first and second links each having first and second ends, each of said first and second links being rotatably mounted on said pin at their respective first ends, the second end of said first link being rotatably supported by said window frame, and a slider, the second end of said second link being rotatably supported by said slider, said slider sliding in the same direction as said first windshield during its opening.

2. A side window according to claim 1, wherein said slidecrank mechanisms include a spring for biasing said slider in the opening direction of said first windshield.

3. A side window according to claim 2, wherein said slider includes a member for engagement with said first windshield.

* * * * *